UNITED STATES PATENT OFFICE.

A. K. EATON, OF NEW YORK, N. Y.

IMPROVEMENT IN MANUFACTURE OF STEEL.

Specification forming part of Letters Patent No. 27,707, dated April 3, 1860.

*To all whom it may concern:*

Be it known that I, A. K. EATON, of New York, in the county of New York and State of New York, have invented a new and useful Improvement in the Manufacture of Steel from Cast-Iron; and I do hereby declare that the following is a full and exact description thereof.

My improvement consists in a new process of manufacturing steel from cast-iron.

Cast-iron in the form of thin bars or plates is packed in an iron box or other suitable receptacle, with sufficient carbonate of soda completely to cover the bars when the salt is in a melted state. The box, with its contents, is subjected to a bright red heat for several hours, the time varying with the thickness of the bars. The soda salt acts both as a purifier of the iron and as a decarbonizing agent. The carbon of the cast-iron is gradually eliminated through its affinity for the oxygen of the soda and passes off as carbonic oxide. Sodium is set free and volatilized, and may be collected beneath the surface of liquids that contain no oxygen in their composition. (Melted paraffine is a suitable liquid for this purpose.) It is more convenient, however, to allow the sodium to become reoxidized by admitting just air enough to effect that purpose through a small opening in the top of the containing vessel. Soda is then reproduced for future use. The process of decarbonization is arrested at such a stage of the operation that there will be left in the iron just the amount of carbon requisite for good steel. The impurities of the cast-iron, silicon, sulphur, and phosphorus are also eliminated, and consequently we find the silicate of soda and the sulphuret and phosphuret of sodium in residuum after the completion of the process.

The condition of the iron and the progress of the operation may be determined at any time by withdrawing a bar and testing it.

The carbonate of potash may be substituted for that of soda in this process.

If we make use of a combination of the carbonates of potash and soda in the proportion of their equivalents, the mixture will retain its fluidity at a lower temperature than soda alone, and therefore would be sometimes preferable.

The oxides of iron and zinc may be used with good effect in combination with the carbonates described.

The hydrates of potash and soda may be used instead of the carbonates, but neither so conveniently nor so economically.

After the carbonates have become very impure by continued use they may be purified by pulverizing, mixing with sawdust, and exposing to a red heat. The resulting material is dissolved in water and recrystallized.

The bars converted into steel by this process may be worked directly under the hammer in rolls, or it may be melted, cast into ingots, and hammered.

This process presents the following essential advantages: It insures the manufacture of a uniform article. It removes silicon, sulphur, and phosphorus—impurities that are only partially removed in the preparation of the best bar-iron for the ordinary steel process. It diminishes materially the cost of manufacture of both the common and the superior kinds of steel.

Having thus fully described my invention, what I claim, and desire to secure by Letters Patent of the United States, is—

The conversion of cast-iron in its solid form into steel, and the simultaneous purification of the same by treatment with the hydrates or carbonates of soda and potash, either alone or combined, substantially as herein described.

A. K. EATON.

Witnesses:
DANIEL BREED,
L. C. ENGLISH.